United States Patent [19]

Bruchez, Jr. et al.

[11] Patent Number: 5,201,887
[45] Date of Patent: Apr. 13, 1993

[54] DAMPER FOR AUGMENTOR LINERS

[75] Inventors: Raymond J. Bruchez, Jr., North Palm Beach; James Hurchalla; Steven B. Johnson, both of Stuart, all of Fla.

[73] Assignee: United Technologies Corporation, Hartford, Conn.

[21] Appl. No.: 798,433

[22] Filed: Nov. 26, 1991

[51] Int. Cl.$^5$ .............................................. F02K 3/10
[52] U.S. Cl. .................................. 60/261; 60/725; 60/752
[58] Field of Search .................... 60/39.31, 39.32, 261, 60/725, 752

[56] References Cited

U.S. PATENT DOCUMENTS

| | | | |
|---|---|---|---|
| 2,509,503 | 5/1950 | Huyton | 60/752 |
| 2,702,987 | 3/1955 | Nicolin | 60/39.32 |
| 2,794,319 | 6/1957 | Stockdale | 60/261 |
| 3,186,168 | 6/1965 | Ormerod et al. | 60/752 |
| 3,826,088 | 7/1974 | Nash et al. | 60/261 |
| 3,866,417 | 2/1975 | Velegol | 60/261 |
| 4,016,718 | 4/1977 | Lauck | 60/39.32 |
| 4,555,901 | 12/1985 | Wakeman et al. | 60/39.32 |
| 4,706,453 | 11/1987 | Vivace | 60/271 |
| 4,817,378 | 4/1989 | Giffin, III et al. | 60/261 |
| 4,833,881 | 5/1989 | Vdoviak et al. | 60/261 |
| 4,912,922 | 4/1990 | Maclin | 60/39.32 |
| 4,932,207 | 6/1990 | Harris et al. | 60/39.32 |
| 5,069,034 | 12/1991 | Jourdain et al. | 60/261 |

FOREIGN PATENT DOCUMENTS 2074308 11/1981 United Kingdom ............... 60/39.32

Primary Examiner—Richard A. Bertsch
Assistant Examiner—Howard R. Richman
Attorney, Agent, or Firm—Norman Friedland

[57] ABSTRACT

Damping of the leading edge of a cantilevered mounted liner for the augmentor of a gas turbine engine is obtained by incorporating a generally annular shaped member having a U-shaped cross section and encapsulating the leading edge of the liner in the U-shaped portion of the annular member. A split ring may be included in the U-shaped portion to augment the damping function.

7 Claims, 5 Drawing Sheets

5,201,887

DAMPER FOR AUGMENTOR LINERS

This invention was made under a U.S. Government contract and the Government has rights herein.

TECHNICAL FIELD

This invention relates to augmentors for gas turbine power plants and more particularly to the liners used therein.

BACKGROUND ART

As is well known in the gas turbine engine technology art, the liner used in the augmentor of a gas turbine engine ensures the structural integrity of the engine case by preventing extremely hot temperatures of the gas path from overheating the outer engine case. Cooling air typically obtained from the compressor or fan flows over the outer surface of the liner wall and flows a portion of the air through a plurality of apertures in the liner to be recaptured into the gas path and discharged through the engine's exhaust nozzle. The liner, obviously must be lightweight and structurally durable. The liner is formed from sheet metal material into a generally cylindrical hollow shell that is co-axially and generally concentric with the augmentor outer case. It is radially spaced from the augmentor case to define an annular passageway where an annular sheath of cooling air flows axially therethrough, while a portion of the cooling air is directed radially into the engine's gas path.

In as much as the liner is considered to be a large diameter structure as is typical in such structures, it responds in complex modes to wide range excitations. Liners that are mounted in cantilevered fashion, as is the case of many existing models, are subjected to a wide range of different loadings and because of the mountings require careful consideration to their design. Added to these considerations is the fact that the liner is corrugated so that it exhibits axial deflections in response to radial loads.

In addition, the liner is formed with a plurality of holes and essentially having a high porosity where there is a wide variety of flow parallel to its axis imposing high dynamic buckling load profiles. Further, service and handling these large diameter structures inevitably results in damage to the leading edge.

It has been observed that the excitation of the leading edge of the liner exhibits a vibratory pattern as shown in FIG. 2. By matching the fundamental radial (RN) and axial (AN) responses with an entrapment means so as to dampen the edge of the structure we have found that we can prevent damage occasioned by vibratory stresses to the leading edge. Additionally, the entrapment structure serves to protect the leading edge from damage occasioned by constant service and mishandling the unit.

DISCLOSURE OF THE INVENTION

An object of this invention is to provide for an augmentor of a gas turbine engine on improved liner.

A feature of this invention is to provide means for damping the leading edge of a cantilevered mounted liner by attaching an annular member generally U-shaped member in cross section that encapsulates the leading edge.

A still further feature is to provide a split ring sandwiched between the legs of the U-shaped annular member.

A still further feature of this invention is to provide a U-shaped annular member riveted to the forward end of the liner of the augmentor and having an elongated leg and welded at the end remote from the liner's leading edge to the liner to enhance damping.

The foregoing and other features and advantages of the present invention will become more apparent from the following description and accompanying drawings.

BEST MODE FOR CARRYING OUT THE INVENTION

While this invention is shown as being utilized in a cantilevered mounted liner for an augmentor of a gas turbine engine, as one skilled in this art will appreciate, this damper may be employed with other types of liners and the like that are designed to include a leading edge disposed in a stream of a fluid medium.

Figure 1:
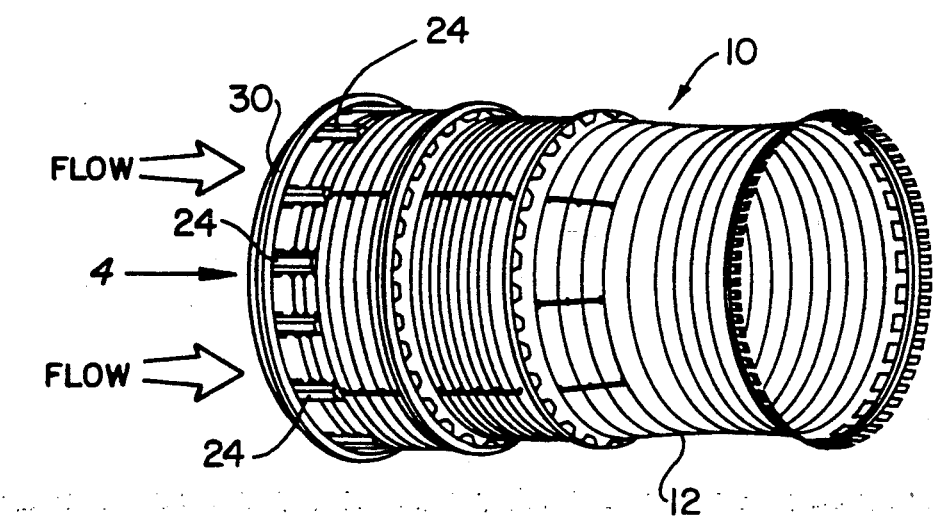
FIG. 1 is a perspective view of a liner for an augmentor of a gas turbine engine.
Figure 3:
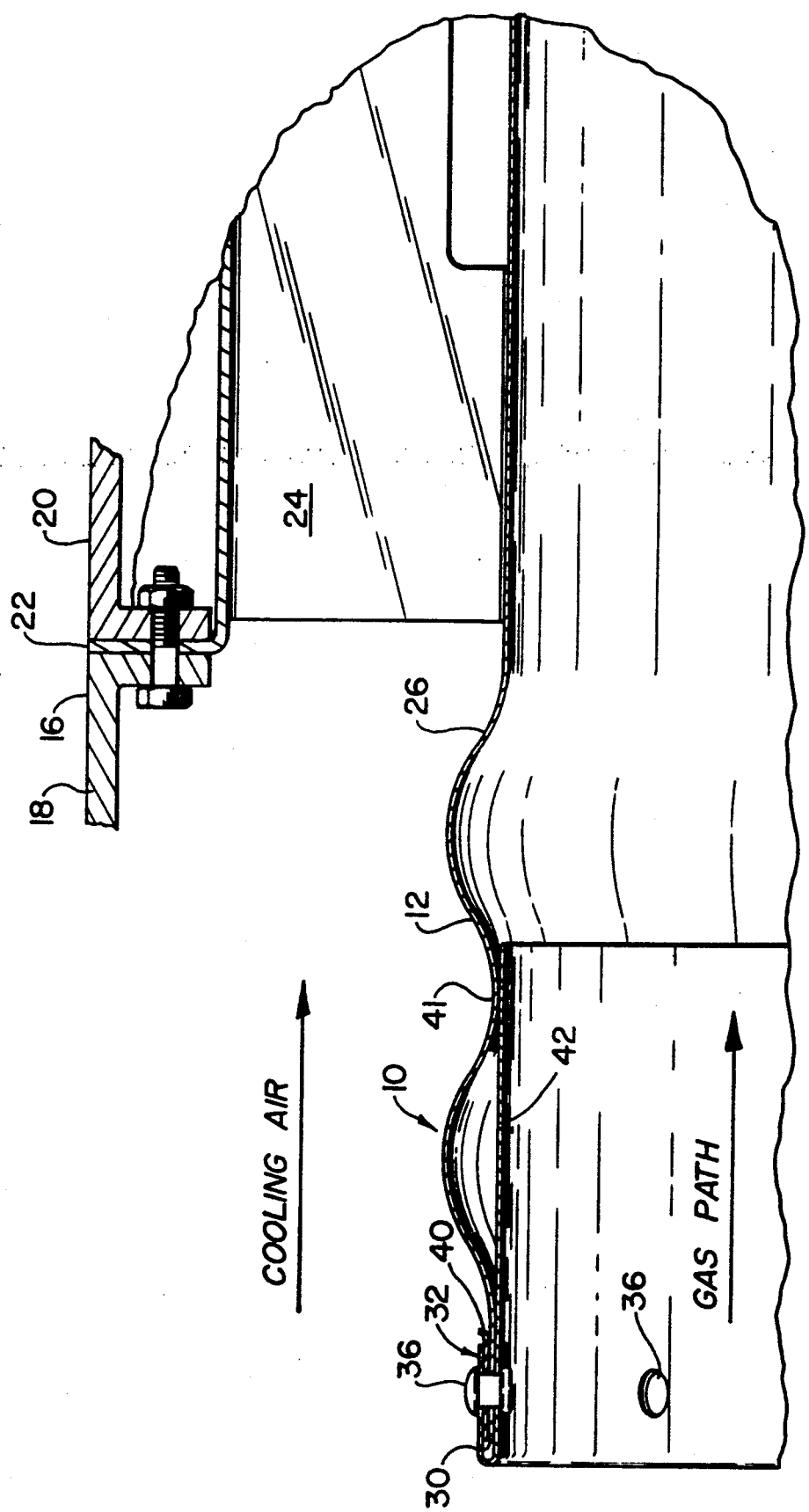
FIG. 3 is an enlarged partial view showing the details of this invention incorporated on the liner of FIG. 1.
Figure 4:
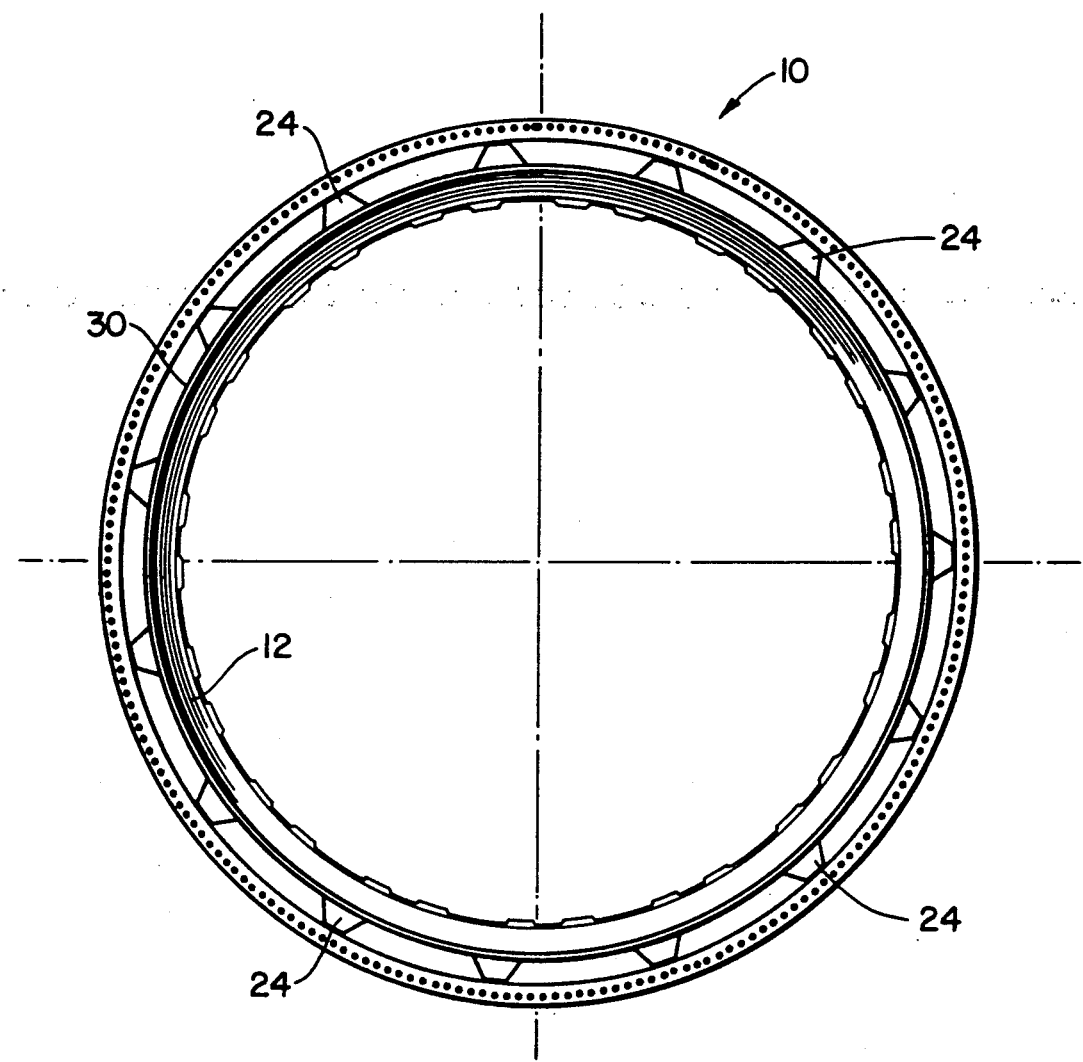
FIG. 4 is a front end view of FIG. 1 viewed in the direction of arrow 4.
Figure 5:
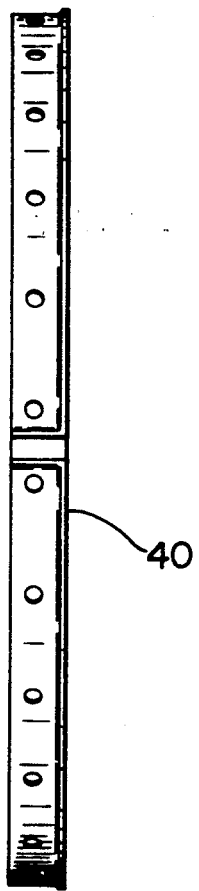
FIG. 5 is a sectional view of the split ring incorporated in the damper depicted in FIG. 3.

Referring to FIGS. 1, 3 and 4, the augmentor liner generally illustrated by reference number 10 is suitably formed in a generally conically-shaped hollow member fabricated from sheet metal and formed in a sinusoidally-shaped or corrugated body 12. The liner 10 is secured to the engine casing 16 at the cooperating and abutting flanges 18 and 20 that sandwich the radial extending portion 22 of bracket 24. Bracket 24, in turn, is suitably bonded, say by welding or riveting, to the outer surface 26 of liner 10.

From the foregoing, it is apparent that the liner 10 is mounted in a cantilever fashion so that the leading edge 30 extends forward of bracket 24 and is exposed to both the cooling air stream and the gas path.

According to this invention, the problem encountered with the above is solved by incorporating the damper generally illustrated by reference numeral 32 which is an annular shaped member U-shaped in cross-section that encapsulates the leading edge 30 of the liner 10. As noted, the leg inner 42 of the U-shaped portion is elongated and extends to the next valley of the corrugated wall 12. To position the damper and to enhance its dampling function, the trailing edge of the elongated leg 42 is secured to the liner which in this illustration is by welding as depicted by weldment 41 by welding.

Figure 2:
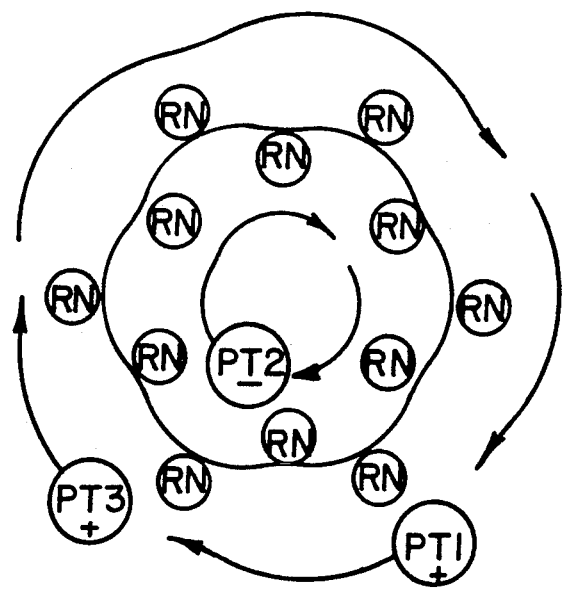
FIG. 2 is a vibration pattern showing the various vibrating modes during augmentor operation.
Figure 6:
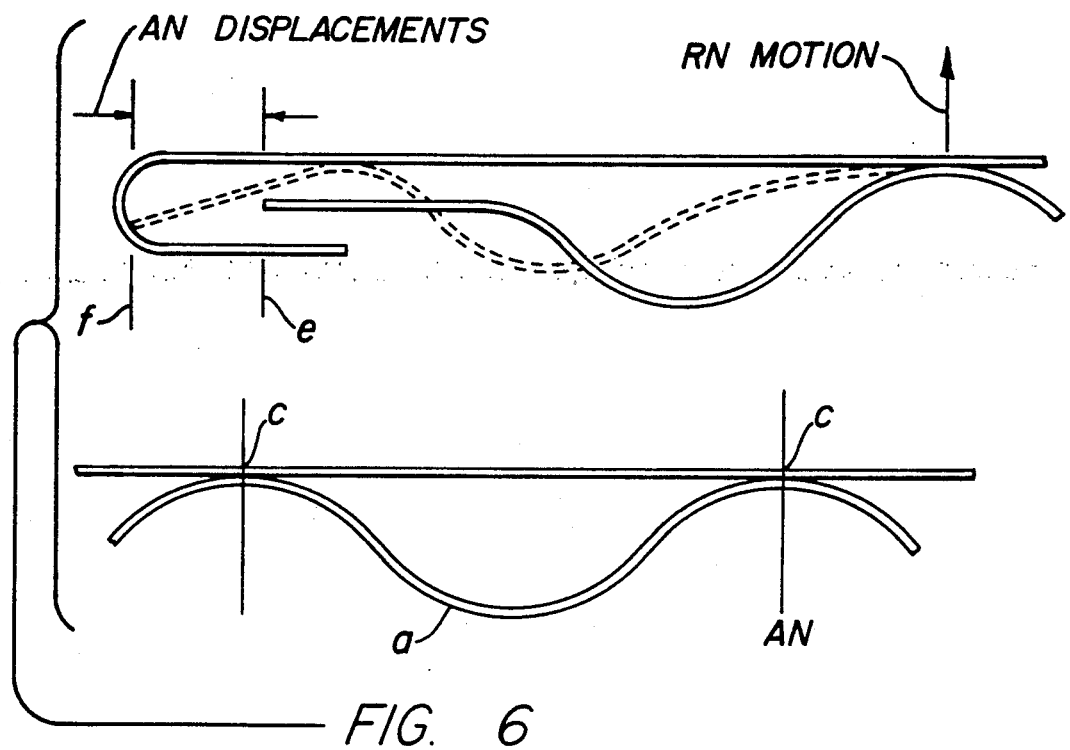
FIG. 6 is a schematic illustration of the distortion of the liner operating through certain vibratory mode.

The entrapment damper 32 utilizes the fundamental radial RN and axial AN responses of the lightweight corrugated liner 12 to locally and progressively damp the end adjacent the leading edge 30 of the liner. As nodes RN (FIG. 2 and FIG. 6) develop, they increasingly engage entrapment damper at points PT1, PT2, PT3, etc., increasing the damping function. Also uniquely as the radial nodes RN develop in the corrugations of the liner, the corrugations locally bellow axially fore "f" and aft "e" (FIG. 6) increasing the damping action through a unique axial (at C) interaction between the structural bellow nodes AN and the entrapment damper 32. The entrapment damper 32 uniquely provides for structural leading edge protection by its scheme which encompasses the lightweight leading edge 30 of the structure in that area.

To enhance damping, in its preferred embodiment, a split ring 40 is disposed within the entrapment damper 32 sandwiched between the liner wall 12 and leg 42 of the U-shaped portion of the annular damper 32. As noted in FIG. 3, a plurality of rivets 36 are circumferentially spaced and are disposed at the U-shaped portion of damper 32 and extend through cooperating apertures formed in the upper and lower legs of the U-shaped member 36 and serve to prevent axial slippage of split ring 40 while enhancing damping by allowing the liner to flex about rivet 36 and frictionally engage the inner surface of damper 32 and hence, dissipate the energy occasioned by the vibratory motion.

Figure 7:
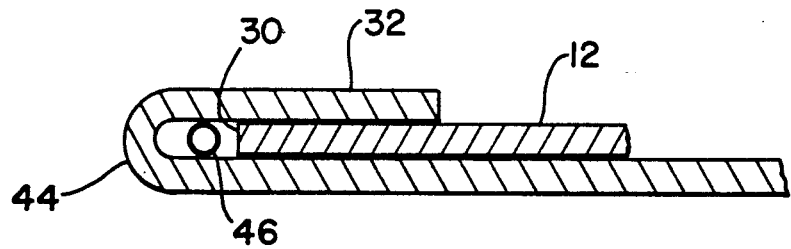
FIG. 7 is another embodiment of this invention.

In another embodiment exemplified in FIG. 7, a spring or tube is inserted in the space between the leading edge 30 and the end 44 of damper 32 (like reference numerals refer to like parts).

Although this invention has been shown and described with respect to detailed embodiments thereof, it will be understood by those skilled in the art that various changes in form and detail thereof may be made without departing from the spirit and scope of the claimed invention.

We claim:

1. A damper for a liner for an augmentor of a gas turbine engine, said augmentor including a pair of generally cylindrically shaped axially aligned casing members having opposing complementary flanges, support means between said flanges for supporting said liner in cantilever relationship, said liner is generally cylindrically-shaped and concentric to said casing members and includes an annular leading edge, said damper comprising an annular member having a U-shaped cross section extending over the edge of said leading edge, said U-shaped cross section including a pair of parallelly disposed axially extending members and a forward portion connected to said pair of parallelly disposed axially extending members having the forward portion disposed in front of said leading edge and with said pair of parallelly disposed axially extending members being contiguous to said liner and encapsulating said leading edge.

2. A damper as claimed in claim 1 wherein, said support means including a plurality of brackets radially extending from said liner and including an extension annular portion mounted between said complementary flanges, said plurality of brackets disposed axially from said leading edge being the sole support of said liner and defining the cantilever arrangement, whereby said damper completely encapsulates said leading edge to dissipate vibratory energy encountered by said liner.

3. A damper as claimed in claim 2 wherein said parallelly disposed axially extending members includes an upper leg and a lower leg, said upper leg being disposed externally of said liner and said lower leg being disposed internally of said liner and including a split ring disposed between said upper leg and said lower leg.

4. A damper as claimed in claim 3 wherein said lower leg of said U-shaped cross section is elongated relative to said upper leg and bonded to said liner beyond one corrugation aft of said leading edge.

5. A damper as claimed in claim 4 including a plurality of circumferentially spaced rivets disposed in the front portion of said damper securing and positioning said split ring.

6. A damper as claimed in claim 5 including spring damping means disposed in the space between the forward portion of the U-shaped cross section and said leading edge.

7. A damper as claimed in claim 5 including tube damping means disposed in the space between the forward portion of the U-shaped cross section and said leading edge.

* * * * *